United States Patent [19]

Iwatani et al.

[11] Patent Number: 4,945,277
[45] Date of Patent: Jul. 31, 1990

[54] CONTROL DEVICE FOR A VEHICLE A.C. GENERATOR

[75] Inventors: Shiro Iwatani; Yutaka Kitamura, both of Himeji, Japan

[73] Assignee: Mitsubishi Denki Kabushiki Kaisha, Tokyo, Japan

[21] Appl. No.: 455,054

[22] Filed: Dec. 22, 1989

[30] Foreign Application Priority Data

Jan. 9, 1989 [JP] Japan ................................. 1-912[U]

[51] Int. Cl.$^5$ ............................................. G08B 21/00
[52] U.S. Cl. ..................................... 340/455; 322/99; 361/21
[58] Field of Search ............... 340/455, 635, 636, 654, 340/653; 361/20, 21; 322/99, 28, 73; 307/10.7

[56] References Cited

U.S. PATENT DOCUMENTS

| 3,656,135 | 4/1972 | Ruff | 340/455 |
| 4,593,233 | 6/1983 | Taylor et al. | 307/10.7 |
| 4,629,968 | 12/1986 | Butts et al. | 322/28 |
| 4,665,354 | 5/1987 | Sada et al. | 361/21 |
| 4,755,737 | 7/1988 | Komurasaki et al. | 361/21 |

FOREIGN PATENT DOCUMENTS 114199 9/1980 Japan .
231830 10/1986 Japan .

Primary Examiner—Joseph A. Orsino
Assistant Examiner—Frank M. Scutch, III
Attorney, Agent, or Firm—Sughrue, Mion, Zinn, Macpeak and Seas

[57] ABSTRACT

A control device for a vehicle a.c. generator comprises a rectifier connected to an armature coil of the a.c. generator, and having a main rectification output terminal for outputting the rectified output to a battery, and an auxiliary rectification terminal connected to one end of the field coil of the generator; a voltage regulator which turns on and off the field current by means of a switching element connected to the other end of the field coil to adjust the output voltage from the generator at a predetermined level; an overvoltage limiting unit including a switching element which conducts when the output voltage from the generator exceeds a predetermined overvoltage value; and a switching unit which is energized by the conduction of the switching element in the overvoltage limiting unit to ground the auxiliary rectification terminal of the rectifier.

4 Claims, 2 Drawing Sheets

CONTROL DEVICE FOR A VEHICLE A.C. GENERATOR

The present invention is related to a control device for a vehicle a.c. generator, and is more particularly concerned with a control device which provides alarm on and protection against an abnormal overvoltage.

Figure 2:
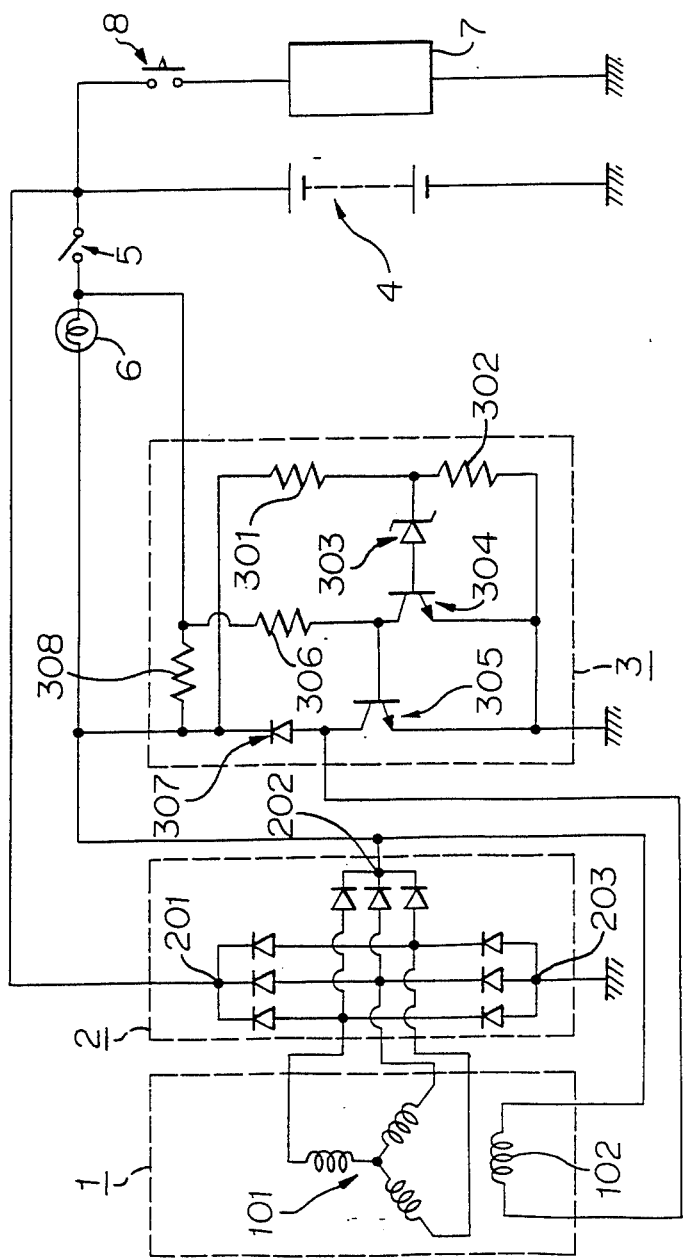

As a control device for a vehicle a.c. generator, the one which is shown in FIG. 2 has been known. In FIG. 2, reference numeral 1 designates an a.c. generator which is driven by a vehicle engine or the like, and which comprises armature coils 101 and a field coil 102. Reference numeral 2 designates a full-wave rectifier which rectifies an a.c. output form the a.c. generator 1, and which has three output terminals 201, 202 and 203. The output terminal 201 serves as a main rectification output terminal which outputs the main output. The output terminal 202 works as an auxiliary rectification output terminal which energizes the field coil 102 and applies the rectified output voltage to a voltage regulator 3 which is described in detail later. The output terminal 203 functions as a ground terminal. Reference numeral 3 designates the voltage regulator which regulates the output voltage from the generator at a predetermined level, and which is constituted by the following elements: Reference numerals 301 and 302 designate voltage-dividing resistors which voltage-divides the voltage from the auxiliary rectification output terminal 202. Reference numeral 303 designates a Zener diode. These elements detects the output voltage from the generator. Reference numeral 304 designates a control transistor which is turned on and off by the conduction and the cutoff of the Zener diode 303. Reference numeral 305 designates an output transistor which is turned on and off by the control transistor 304 to control the field current which flows through the field coil 102. Reference numeral 306 designates a base resistor for the output transistor 305. Reference numeral 307 designates a diode which is connected in parallel with the field coil 102 and absorbs interruption surges produced in the field coil 102. Reference numeral 308 designates a resistor for initially energizing the field coil. Reference numeral 4 designates a battery which is charged by the output voltage from the generator. Reference numeral 5 designates a key switch. Reference numeral 6 designates an indication lamp. Reference numeral 7 designates an electric load at the side of the vehicle. Reference numeral 8 designates a load switch.

Since the conventional control device is constructed as just above mentioned, when the key switch 5 is closed at the time of starting the engine, an initial energizing current flows from the battery 5 to the key switch 5, and in the field coil 102 through the parallel circuit comprising the indication lamp 6 and the initial energizing resistor 308, placing the generator 1 in the state wherein the generator can produce power. At the same time, the indication lamp 6 lights up, indicating that the generator is producing no power.

When the engine starts to rotate, the generator 1 commences to generate electricity, causing the voltage at the auxiliary rectification output terminal 202 of the rectifier 2 to raise. After that, the potential difference across the indication lamp 6 is gradually decreasing. When the potentials across the indication lamp have reached the same, the lamp goes out, indicating that the generator has started to generate electricity.

The voltage regulator 3 detects the output voltage at the auxiliary rectification output terminal 202 of the rectifier 2 by means of the voltage-dividing resistors 301 and 302, and the Zener diode 303. When the output voltage at the auxiliary rectification output terminal 202 exceeds a predetermined value which is set by the voltage-dividing resistors 301 and 302, and the Zener diode 303, it causes the Zener diode 303 to conduct, allowing the control transistor 304 to conduct. Conversely, when the output voltage at the auxiliary rectification output terminal 202 has reaches not higher than a predetermined value, it causes the Zener diode 303 to be cut off, placing the control transistor 304 in the nonconducting state. In this way, the control transistor 304 is turn on and off, and accordingly the output transistor 305 is turned on and off to control the field current which flows through the field coil 102, allowing the output voltage of the generator to be regulated at a predetermined level.

In the conventional device, if the output transistor 305 should be short circuited, or if one end of the field coil 102 is grounded through a metallic foreign material, the field current tumbles out of the turn on and off control, being taken in the noncontrol state wherein the field current is constantly flowing. As a result, the output voltage from the generator 1 achieves an abnormally high level, and the battery 4 is, therefore, overcharged, causing the electrolyte in the battery to decrease early. At this time, the indication lamp 6 indicates no alarm on such abnormal conditions. If such noncontrol state occurs at the time of driving at a high speed and is continued for a long time, the reaction of the electrolyte in the battery 4 is aggravated to cause hydrogen gas to generate actively. If the worst happens, there is a possibility that the battery is broken. In addition, such abnormally increased output voltage from the generator 1 can give difficulties to the electric load 7 at the side of the vehicle. For example, when the output voltage becomes abnormally high while the head lights are lighting in night drive, an overcurrent can flow in the head lights to cause the head lights to blow. Further, computers have been recently used to control vehicle engines. There is a problem in that an abnormal overvoltage can damage a computer to become unable of controlling the engine, and consequently to stop the engine.

As explained in detail, the conventional control device having the structure already mentioned involves the problems in that when the output transistor is short-circuited, the output voltage from the generator is placed under the noncontrol state to become an abnormal overvoltage, and in that if the worst happens, the battery can be broken due to overcharge, driving the car can become difficult due to the head lamps blowing, and the engine can stop because of the computer for controlling the engine being damages.

It is an object of the present invention to eliminate the problems of the conventional control device and to provide a new and improved control device capable of detecting the presence of an abnormal condition, and of interrupting a field current to stop an abnormal electricity generation when an output transistor is short-circuited to cause a noncontrol state to be created.

The foregoing and other objects of the present invention have been attained by providing a control device for a vehicle a.c. generator, comprising a rectifier connected to an armature coil of the a.c. generator, and having a main rectification output terminal for outputting the rectified output to a battery, and an auxiliary rectification terminal connected to one end of the field coil of the generator; a voltage regulator which turns on and off the field current by means of a switching element connected to the other end of the field coil to adjust the output voltage from the generator at a predetermined level; an overvoltage limiting unit including a switching element which conducts when the output voltage from the generator exceeds a predetermined overvoltage value; and a switching unit which is energized by the conduction of the switching element in the overvoltage limiting unit to ground the auxiliary rectification terminal of the rectifier.

The switching element in the overvoltage limiting unit according to the present invention conducts when the generator outputs an abnormal overvoltage. As a result, the switching unit is energized. The excitement of the switching unit allows the auxiliary rectification output terminal to be grounded, interrupting the field current and stopping the abnormal power generation.

Figure 1:
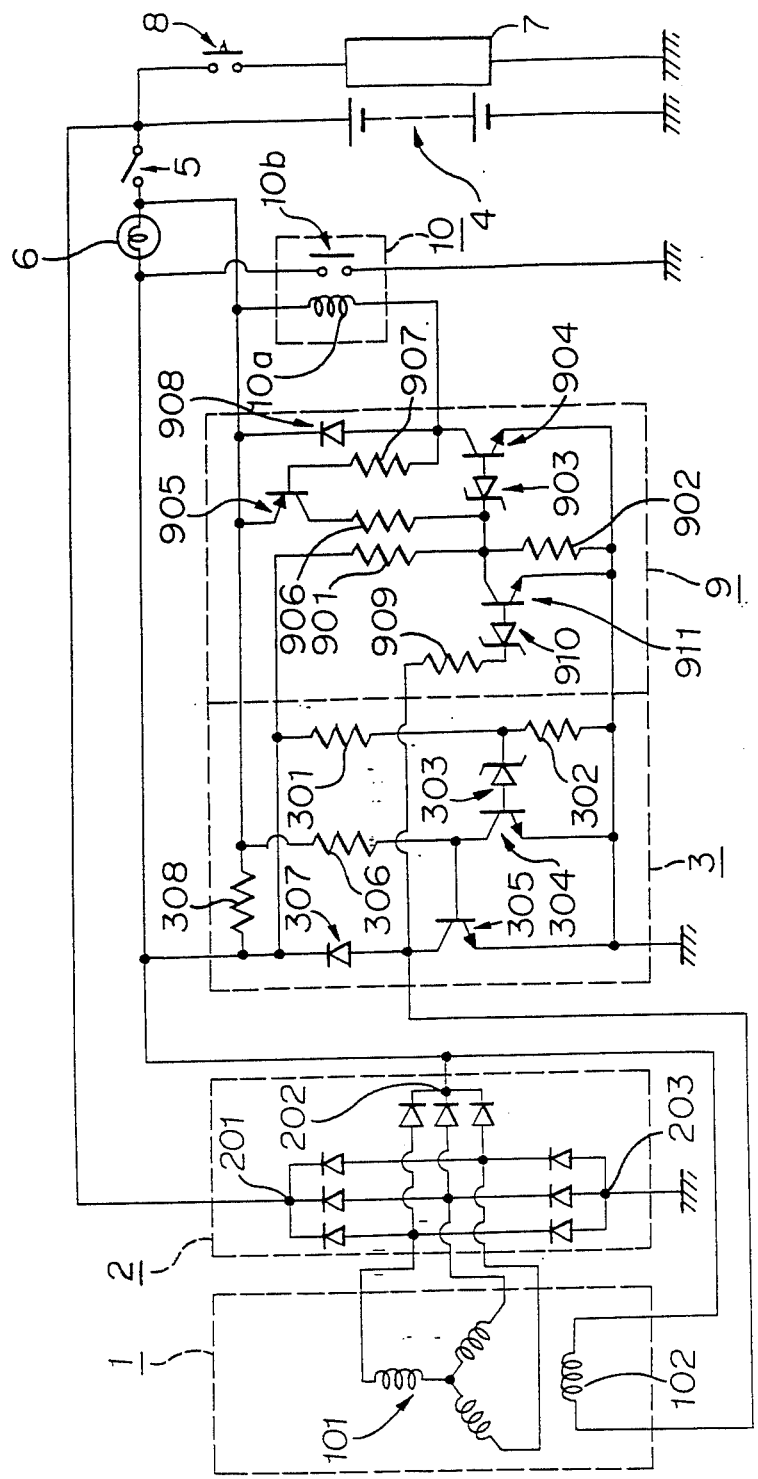

In drawings:

FIG. 1 is an electric circuit diagram of an embodiment of the control device according to the present invention; and FIG. 2 is an electric circuit diagram of the conventional control device.

In FIG. 1 which is an electric circuit diagram of an embodiment of the control device according to the present invention, parts corresponding to those in the conventional control device shown in FIG. 2 are indicated in the same reference numerals, and explanation on the parts will be omitted to the sake of clarity. The structure and the operation peculiar to the embodiment will be mainly explained.

In FIG. 1, reference numeral 9 designates an overvoltage limiting circuit which is constituted by the following elements: Reference numerals 901 and 902 designate voltage-dividing resistors which voltage-divide the output voltage at an auxiliary rectification output terminal 202 of an a.c. generator 1. Reference numeral 903 designates a Zener diode. These elements are used to detect whether the output voltage from the generator 1 is an abnormal overvoltage or not. Reference numeral 904 designates a transistor which is conducted when the Zener diode 903 is conducted. Reference numeral 905 designates a transistor. Reference numerals 906 and 907 are resistors. The elements 905-907 constitute a holding circuit for holding the conduction state of the transistor 904. Reference numeral 908 designates a diode which absorbs interruption serge occurred in a coil 10a of a switching unit 10 which will be described later. Reference numeral 909 designates a resistor, reference numeral 910 designates a Zener diode, and reference numeral 911 designates a transistor. The elements 909-911 constitute a circuit which detects whether an output transistor 305 of a voltage regulator 3 is under the conducting state or the non-conducting state. Reference numeral 10 designates the switching unit which includes the coil portion 10a and a contact portion 10b. In the coil portion, a current flows when the transistor 904 in the overvoltage limiting unit 9 conducts. Both ends of the contact portion 10b are connected to the auxiliary rectification output terminal 202 of the generator 1 and to ground. When the current flows through the coil portion 10a, the contact portion 10b is closed due to the excitation of the coil portion.

Now, the operation of the embodiment will be explained.

The operation of the voltage regulator 3 which is between the closure of a key switch 5 and the commencement of power generation at the time of starting the engine is similar to that of the conventional control device.

In the embodiment, when an output transistor 305 in the voltage regulator is short-circuited, or when one end of a field coil 102 is grounded through a metallic foreign material, a voltage regulator 3 gets in a noncontrol state, causing the output voltage from the generator to be raised. However, the operation which will be described next can stop abnormal power generation.

Firstly, when the voltage at the auxiliary rectification output terminal 202 exceeds a set value for overvoltage which can be set by the voltage-dividing resistors 901 and 902, and the Zener diode 903 in the overvoltage limiting unit 9, it causes the Zener diode 903 to conduct, allowing the transistor 904 to conduct. As a result, the coil portion 10a of the switching unit 10 is energized to close the contact portion 10b, causing the auxiliary rectification output terminal 202 to be grounded. In other words, the field current is interrupted by grounding the supply source of the field current to stop the abnormal power generation. In this way, explosion of a battery 4, the burnout of the head light, the breakage of a computer, and or the like can be prevented before such trouble happens. In addition, an indication lamp 6 has one end grounded to light up, providing a driver with warning of the existence of the abnormal condition. In this way, the control device urges the driver to stop the driving and to do repairs.

In the embodiment, there is also provided a holding circuit which is constituted by the transistor 905 and the resistors 906 and 907 in order to prevent the occurrence of the case in that the voltage divided by the voltage-dividing resistors 901 and 902 is lowered by grounding the auxiliary rectification output terminal 202 to cause chattering to occur in the control system. When the transistor 904 in the overvoltage limiting unit 9 conducts, a base current flows in the transistor 905 through one 907 of the resistors of the holding circuit, allowing the transistor 905 to conduct. The conduction of the transistor 905 causes the divided voltage to be increased by the other resistor 906. As a result, even after the auxiliary rectification output terminal 202 has been grounded, the conducting state of the Zener diode 903 and the transistor 904 in the overvoltage limiting unit 9 can be held. This holding operation can be released by opening the key switch 5 to stop driving.

Further, in the embodiment, the resistor 909, the Zener diode 910 and the transistor 911 constitute a malfunction prevention circuit to prevent the malfunction which is brought about by a temporary increase in output from the generator 1 which can occur at the time of interrupting a great deal of electric load at the side of the vehicle. Specifically, when the output voltage from the generator 1 temporarily increases at the time of interrupting the electric load 7 having a great value, the output transistor 305 in the voltage regulator 3 is driven to cut off. At that time, the resistor 909 and the Zener diode 910 detects that the collector potential of of the output transistor 305 is at a high level. Thus, the Zener diode 910 is driven to conduction to allow the transistor 911 to conduct, lowering the voltage divided by the voltage-dividing resistors 901 and 902. As a result, even if the output voltage at the auxiliary rectification output terminal 202 increases in such case, the transistor 904 in the overvoltage limiting unit 9 is prevented from conducting and the switching unit is not energized. In this way, the malfunction of the overvoltage limiting unit 9 can be prevented.

Although in the embodiment the overvoltage limiting 9 and the switching unit 10 are separate, both units can be constructed as one unit.

What is claimed is:

1. A control device for a vehicle a.c. generator comprising:
   a rectifier connected to an armature coil of the a.c. generator, and having a main rectification output terminal for outputting the rectified output to a battery, and an auxiliary rectification terminal connected to one end of the field coil of the generator;
   a voltage regulator which turns on and off the field current by means of a switching element connected to the other end of the field coil to adjust the output voltage from the generator at a predetermined value;
   an overvoltage limiting unit including a switching element which conducts when the output voltage from the generator exceeds a predetermined overvoltage level; and
   a switching unit which is energized by the conduction of the switching element in the overvoltage limiting unit to ground the auxiliary rectification terminal of the rectifier.

2. A control device according to claim 1, further comprising an indication lamp which is grounded when the switching unit is energized, providing warning on the existence of an abnormal condition.

3. A control device according to claim 1, further comprising a holding circuit for holding the conduction state of the switching element of the overvoltage limiting unit.

4. A control device according to claim 1, further comprising a malfunction prevention circuit which prevents the switching unit from being energized even if the output from the generator has temporarily increased.

* * * * *